Figures 1, 2:
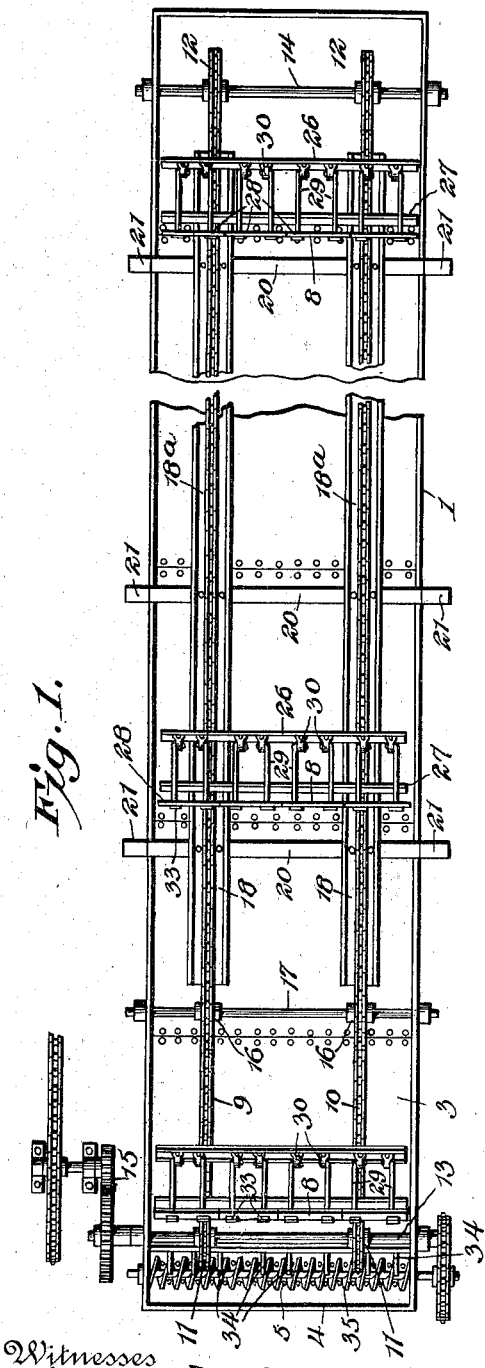

No. 731,754. PATENTED JUNE 23, 1903.
J. S. CLARKE.
SALT GRAINING APPARATUS.
APPLICATION FILED JULY 29, 1902.
NO MODEL. 2 SHEETS—SHEET 1.

Witnesses
Howard W. Orr
Louis G. Julihn

Inventor
John S. Clarke,
By C. G. Siggers
Attorney

No. 731,754. PATENTED JUNE 23, 1903.
J. S. CLARKE.
SALT GRAINING APPARATUS.
APPLICATION FILED JULY 29, 1902.
NO MODEL. 2 SHEETS—SHEET 2.
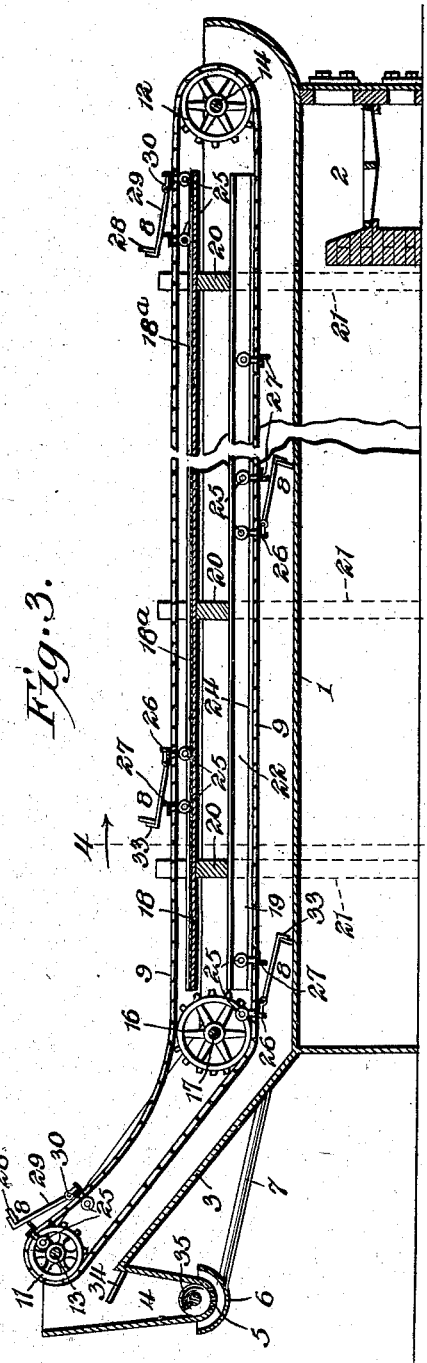
John S. Clarke, Inventor,
Witnesses No. 731,754. Patented June 23, 1903.

UNITED STATES PATENT OFFICE.

JOHN S. CLARKE, OF ST. CLAIR, MICHIGAN.

SALT-GRAINING APPARATUS.

SPECIFICATION forming part of Letters Patent No. 731,754, dated June 23, 1903.

Application filed July 29, 1902. Serial No. 117,550. (No model.)

*To all whom it may concern:*

Be it known that I, JOHN S. CLARKE, a citizen of the United States, residing at St. Clair, in the county of St. Clair and State of Michigan, have invented a new and useful Salt-Graining Apparatus, of which the following is a specification.

This invention relates to a novel salt-graining apparatus for separating salt from brine by means of an evaporating-pan and a raking device for removing the salt precipitated by the process of evaporation.

The invention has for its primary object to provide a novel form of rake which will keep the brine in motion to prevent the burning of the pan and which will thoroughly remove the salt from the pan as it accumulates.

A further object of the invention is to provide simple and effective means for discharging the salt from the rakes as the latter reach the upper end of the draining-board.

Another object of the invention is to locate the supporting and operating mechanism for the rakes entirely above the surface of the brine, so as to reduce the liability of the parts to rust, and to mount the rake-carrier for antifrictional movement for the purpose of economizing the power required for the continuous operation of the rakes.

Still another object of the invention is to insure the removal of the salt from uneven or depressed portions of the pan-bottom by constructing each individual rake of a series of independent flexibly-supported sections.

Various other objects and novel features of construction will appear during the course of the succeeding description of that embodiment of the invention which for the purpose of this application is illustrated in the accompanying drawings and succinctly defined in the appended claims.

In said drawings, Figure 1 is a plan view of my apparatus complete. Fig. 2 is a side elevation thereof. Fig. 3 is a longitudinal sectional view. Fig. 4 is a transverse sectional view on the line 4 4 of Fig. 3; and Fig. 5 is a detail perspective view of a portion of a chain, a complete rake, and connected parts.

Like numerals of reference are employed to designate corresponding parts throughout the several views.

1 indicates an evaporating-pan of what is known as the "direct-heat" type. The pan is heated directly by a furnace 2, located under its front end, and at its rear end is the usual upwardly-inclined draining-board 3. Brine is supplied to the pan in any suitable manner and from any available source, and as the salt forms upon its surface by reason of the evaporation of the liquid it is precipitated to the bottom of the pan. The brine is kept in motion and the precipitated salt is scraped from the bottom of the pan by means to be described and is carried up the draining-board 3, from the end of which it is discharged into a hopper 4, having a foraminous bottom 5, through which any brine deposited with the salt will escape to a return-trough 6 and thence through a return-pipe 7 to the pan. (See Fig. 3.)

The mechanism for agitating the brine and scraping the salt from the pan comprises an endless rake-carrier mounted above the pan and a series of spaced rakes 8, movable with the carrier and arranged when traveling in one direction to move along the bottom of the pan from end to end thereof and up the draining-board, said rakes being supported above the brine during their passage back to the front end of the pan. The endless carrier includes a pair of sprocket-chains 9 and 10, passed around sprocket-wheels 11 and 12, located at the rear end of the draining-board and at the front end of the pan, respectively. These sprocket-wheels are keyed upon shafts 13 and 14, journaled in suitable bearings beyond the opposite sides of the pan, one of said shafts—as, for instance, the shaft 13—being driven by power applied from any suitable source. When the rake-carrier is operated from an engine, speed-reducing gearing 15 is preferably interposed between the engine and the driven shaft. At the lower end of the draining-board the chains engage idle sprockets 16, mounted on a transverse shaft 17, said sprockets serving to effect the deflection of the rake-carrier necessitated by the inclination of the draining-board.

The horizontal runs of the conveyer-chains are sustained in proper position by upper and lower tracks 18 and 19, extending longitudinally of the pan above the same and supported by transverse beams 20, carried by posts 21, upstanding from opposite sides of the pan.

Each of the lower tracks comprises a pair of pendent plates 22 and 23, having oppositely-disposed flanges or rails 24, upon which run the rollers of roller-carriages 25. The roller-carriages of the two chains are paired and are connected by transverse angle-iron bars 26 and 27. These bars are connected in any suitable manner to both chains to compel their movement in unison and serve to support the horizontal runs of the chains from the roller-carriages. The lower horizontal run of the endless rake-carrier will thus be suspended from roller-carriages traveling along the lower or pendent tracks 19, while the upper horizontal run thereof will be supported upon roller-carriages traveling along the upper tracks 18, preferably having the form of flat plates covered by glass facings 18$^a$ to prevent rusting and provided with side flanges to prevent the derailment of the carriages.

The rakes 8 each consist of a number of short plates or sections 28, disposed end to end and each carried by the free ends of a pair of swinging rake-arms 29, having hinged connection with brackets 30, riveted or otherwise secured to one of the bars 26. The axis of the swinging rake-arms, which form the connection between the rakes or scrapers and the conveying means, is transverse to the movement of the latter. Each section of each rake will thus be seen to have an independent flexible support, so that as the rake travels over the surface of the pan its sections will yield individually to accommodate any unevenness in the bottom of the pan, and thus insure the thorough scraping thereof and the complete removal of the salt. It is also desirable to permit each of the rake or scraper sections to have more or less endwise-tilting movement, as well as a bodily movement toward and away from the normal plane of the pan-bottom. Provision for this movement is made by forming a loose connection between each of the rake-sections 28 and the supporting-arms. This may be accomplished, as shown in Fig. 5, by forming the sections 28 with short slots 31 for the reception of the bolts 32, which connect said sections with the angular ends 33 of the rake-arms 29. By this construction a rocking movement is given to the rakes or scrapers about axes substantially parallel to the direction of movement of the conveyer.

It will now be seen that as the rake-carrier is operated the rakes carried by the lower run thereof will be drawn along the bottom of the pan to agitate the brine and to scrape the precipitated salt from the bottom of said pan, the complete removal of the salt from the depressed portions thereof being insured by the capability of the rake-sections to conform to the uneven surface of the pan-bottom. The salt carried to the rear end of the pan by the rakes will be drawn over the inclined draining-board, down which most of the brine will drain.

As the rakes reach the rear upper end of the draining-board the supporting-arms will naturally swing to substantially vertical positions, and I propose to utilize this movement for the purpose of insuring the delivery of the salt from the rakes to the hopper 4. Just below the plane of the draining-board and beyond its rear end I provide clearing-rods 34, disposed over the hopper. As a loaded rake reaches the end of the draining-board it will drop with more or less force upon the rods 34 and being suddenly arrested the salt will be detached from the rake and will drop into the hopper 4, from whence it will be conveyed by a screw conveyer 35, located in the bottom of the hopper. As the rakes reach the rear end of the carrier and pass around the sprockets 11 to the upper run of said carrier they drop back and are supported by the angle-iron bars 27, which are properly spaced from the bars 26 to engage and constitute rests for the rake-arms, as shown. Supported thus in a plane above the brine the rakes will travel back to the front end of the pan, and upon passing around the front sprockets 14 will again drop into the brine to effect the removal of the precipitated salt in the manner just described.

The rakes are located at proper distances apart to permit the graining of the salt at the surface of the brine, and by regulating the degree of heat and the degree of separation of the rakes salt of any desired grade may be obtained. As the rakes extend substantially from side to side of the pan and serve to distribute the heat by the continuous agitation of the brine, the capacity of the apparatus is increased and the consumption of fuel is economized.

In constructing the apparatus any approved form of pan may be adopted; but I prefer to construct said pan from a number of metal plates or sections connected by buck-lapped joints, as the plates thus connected present a smooth unbroken surface, opposing the least possible resistance to the removal of the salt by the rakes or scrapers.

It is thought that from the foregoing the construction and operation of my novel salt-graining apparatus will be readily apparent; but while the illustrated embodiment of the invention appears at this time to be preferable I wish to be distinctly understood as reserving to myself the right to effect such changes, modifications, and variations of the illustrated structure as may be fairly embraced within the scope of the protection prayed.

What I claim is—

1. In a salt-graining apparatus, the combination with an evaporating-pan, of a conveyer movable longitudinally thereof and having a scraper-arm, a scraper, and means for connecting the scraper to the scraper-arm to permit independent rocking movement of said scraper about an axis substantially parallel to the direction of movement of the conveyer.

2. In a salt-graining apparatus, the combination with a series of scrapers each composed of a plurality of separate sections, of means for moving the scrapers longitudinally of the pan, separate connections between said means and each section of the several scrapers, each of the scraper-sections being movable on the connection about axes both parallel and transverse to the direction of movement of the scrapers, whereby the individual scraper-sections of each scraper may adapt themselves to the bottom of the pan.

3. In a salt-graining apparatus, the combination with an evaporating-pan, of an endless conveyer movable longitudinally thereof and provided with scraper-arms, a series of scrapers each composed of a plurality of separate sections, and means connecting said sections to the arms, said means permitting a rocking movement of each scraper-section about an axis substantially parallel to the direction of movement of the conveyer.

4. In a salt-graining apparatus, the combination with an evaporating-pan, of rake-arms, and a rake movable over the bottom of the pan, said rake being composed of separate rake-sections disposed end to end transversely across the pan, each of said sections having loose connection with a rake-arm to rock independently about an axis disposed longitudinally of the pan.

5. In a salt-graining apparatus, the combination with an evaporating-pan, of rake-arms, and a rake movable over the bottom of the pan, said rake being composed of separate sections disposed end to end, said sections being independently movable toward and from the bottom of the pan and capable of endwise-tilting movement independently of the rake-arms.

6. In a salt-graining apparatus, the combination with a pan, of a carrier, a rake-arm movable with the carrier, and a rake connected to the arm for independent tilting movement.

7. In a salt-graining apparatus, the combination with a pan, of a carrier, a rake-arm hinged to the carrier, and a rake connected to the arm for tilting movement independently thereof.

8. In a salt-graining apparatus, the combination with an evaporating-pan, of a rake-bar, rake-arms movably connected to the rake-bar, and a rake comprising independently-movable sections having flexible connection with the rake-arms.

9. In a salt-graining apparatus, the combination with an evaporating-pan, and a rake-bar, of a rake comprising a series of independent sections, and a pair of rake-arms having flexible connection with each of the rake-sections and hinged to the bar.

10. In a salt-graining apparatus, the combination with an evaporating-pan, of an endless rake-carrier, upper and lower tracks, roller-carriages connected to the endless carrier and disposed to travel upon said tracks, rake-bars having connection intermediate of their ends with the roller-carriages, and rakes each comprising separate sections having independent connection with a rake-bar.

11. In a salt-graining apparatus, the combination with an evaporating-pan, of an endless rake-carrier comprising a pair of endless sprocket-chains, upper and lower tracks associated with each chain, rake-bars connecting the sprocket-chains, rakes secured to the rake-bars for movement therewith, and roller-carriages disposed to travel upon the tracks, said roller-carriages being laterally offset from the rake-bars and connected thereto.

12. In a salt-graining apparatus, the combination with an evaporating-pan, of a series of transverse beams disposed above the same, upper and lower tracks disposed longitudinally of the pan and secured to the upper and lower sides of said beams, roller-carriages mounted to travel on the tracks, an endless rake-carrier having its upper and lower runs disposed above the upper track and below the lower track, respectively, rake-bars secured to the endless carrier and having connection with the roller-carriages, and rakes connected to the rake-bars for movement therewith.

13. In a salt-graining apparatus, the combination with an evaporating-pan, and an endless rake-carrier, of transverse rake-bars and rest-bars connected to the carrier for movement therewith, and swinging rakes secured to the rake-bars and disposed to rest upon the rest-bars when traveling along the upper run of the endless carrier.

14. In a salt-graining apparatus, the combination with an evaporating-pan, of endless sprocket-chains connected by angle-iron rake-bars and rest-bars disposed transversely of the pan, rakes, and swinging rake-arms secured to the rakes and rake-bars, respectively, and disposed to rest upon the rest-bars during the travel of the rakes in one direction.

15. In a salt-graining apparatus, the combination with an evaporating-pan, of an endless rake-carrier, angle-iron rake-bars and rest-bars connected to the carrier, a plurality of independently-swinging rake-arms connected to each rake-bar for movement therewith, and a rake comprising independently-movable sections secured to the rake-arms, said arms being disposed for support by the rest-bars during the travel of the rake in one direction.

16. In a salt-graining apparatus, the combination with an evaporating-pan provided at one end with a draining-board, of a rake disposed to travel over the bottom of the pan and up the draining-board, and a clearing device located at the upper end of the draining-board for removing the salt from the rake.

17. In a salt-graining apparatus, the combination with an evaporating-pan having a draining-board at one end, of a swinging rake, means for moving the rake over the bottom of the pan and up the draining-board, and a clearing device disposed in the path of the rake as the latter swings away from the end of the draining-board, whereby the rake is suddenly arrested and the salt cleared therefrom.

18. In a salt-graining apparatus, the combination with an evaporating-pan, of an endless rake-carrier disposed in a plane above the same, a plurality of swinging rakes connected to the carrier and movable over the bottom of the pan, a hopper located beyond one end of the pan, and a clearing device disposed over the hopper and in position to contact with the rakes to clear the salt therefrom and insure its delivery to the hopper.

19. In a salt-graining apparatus, the combination with an evaporating-pan having a draining-board at one end, of a hopper disposed to receive the salt from the draining-board and having a perforated bottom for the escape of brine, a trough disposed below the hopper to catch the brine escaping therefrom, and a return-pipe leading from the trough to the evaporating-pan.

20. In a salt-graining apparatus, the combination with an evaporating-pan having a draining-board at one end, of a hopper located beyond the draining-board and having a perforated bottom, a trough below the hopper, a return-pipe leading from the trough to the pan, an endless rake-carrier, a series of swinging rakes movable with the carrier, a clearing device located above the hopper to clear the rakes, and a conveyer located within the hopper to convey the salt therefrom.

In testimony that I claim the foregoing as my own I have hereto affixed my signature in the presence of two witnesses.

JOHN S. CLARKE.

Witnesses:
DAVID C. McELROY,
C. J. MITCHELL.